Nov. 16, 1926.
J. H. HAMMOND, JR., ET AL
1,607,456
METHOD AND SYSTEM FOR THE TRANSMISSION OF RADIANT ENERGY
Original Filed May 8, 1918    6 Sheets-Sheet 1
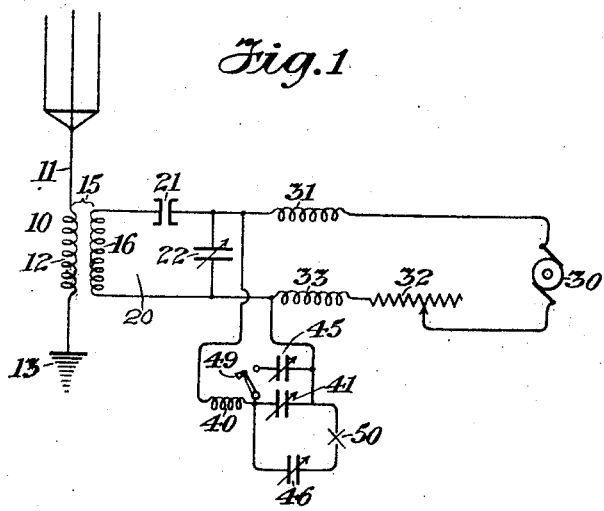
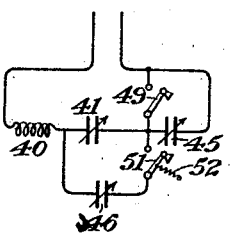 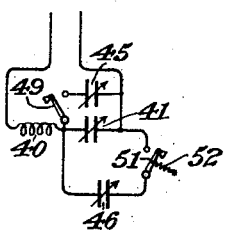 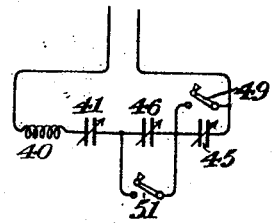
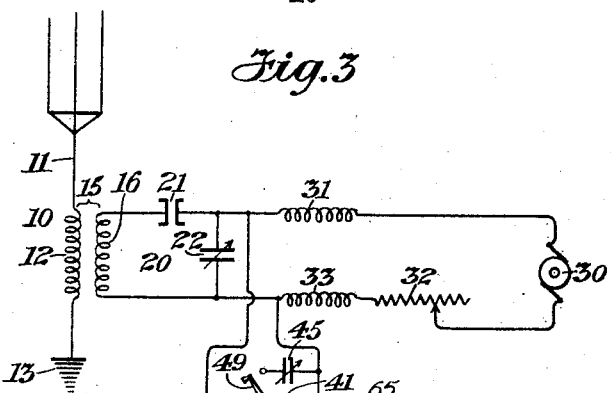

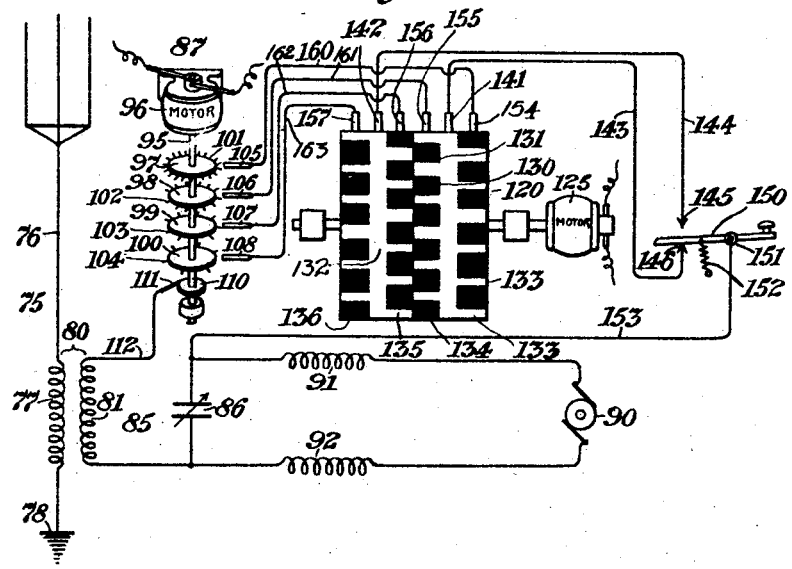

Nov. 16, 1926.

J. H. HAMMOND, JR., ET AL 1,607,456

METHOD AND SYSTEM FOR THE TRANSMISSION OF RADIANT ENERGY

Original Filed May 8, 1918  6 Sheets-Sheet 3

Nov. 16, 1926. 1,607,456
J. H. HAMMOND, JR., ET AL
METHOD AND SYSTEM FOR THE TRANSMISSION OF RADIANT ENERGY
Original Filed May 8, 1918 6 Sheets-Sheet 4

WITNESS
Chas. F. Clagett

INVENTORS
John Hays Hammond Jr.
Emory Leon Chaffee
BY A. S. Gardner
THEIR ATTORNEY Nov. 16, 1926.                                              1,607,456
              J. H. HAMMOND, JR., ET AL
    METHOD AND SYSTEM FOR THE TRANSMISSION OF RADIANT ENERGY
           Original Filed May 8, 1918    6 Sheets-Sheet 5

WITNESS
Chas. F. Clagett

INVENTOR
John Hays Hammond Jr.
Emory Leon Chaffee
BY A. J. Gardner
THEIR ATTORNEY Nov. 16, 1926.　　　　　　　　　　　　　　　1,607,456
J. H. HAMMOND, JR., ET AL
METHOD AND SYSTEM FOR THE TRANSMISSION OF RADIANT ENERGY
Original Filed May 8, 1918　　6 Sheets-Sheet 6

WITNESS
Chas. F. Clagett

INVENTOR
John Hays Hammond Jr.
Emory Leon Chaffee
BY
A. J. Gardner
THEIR ATTORNEY Patented Nov. 16, 1926.

1,607,456

UNITED STATES PATENT OFFICE.

JOHN HAYS HAMMOND, JR., OF GLOUCESTER, AND EMORY LEON CHAFFEE, OF BELMONT, MASSACHUSETTS; SAID CHAFFEE ASSIGNOR TO SAID HAMMOND.

METHOD AND SYSTEM FOR THE TRANSMISSION OF RADIANT ENERGY.

Application filed May 8, 1918, Serial No. 233,311. Renewed May 1, 1925.

Some of the objects of this invention are to provide improved methods for the transmission of radiant energy; to provide improvements in systems for the transmission of radiant energy; to provide improved methods for receiving radiant energy; to provide improvements in systems for receiving radiant energy; and to provide other improvements as will appear hereinafter.

Figure 6:
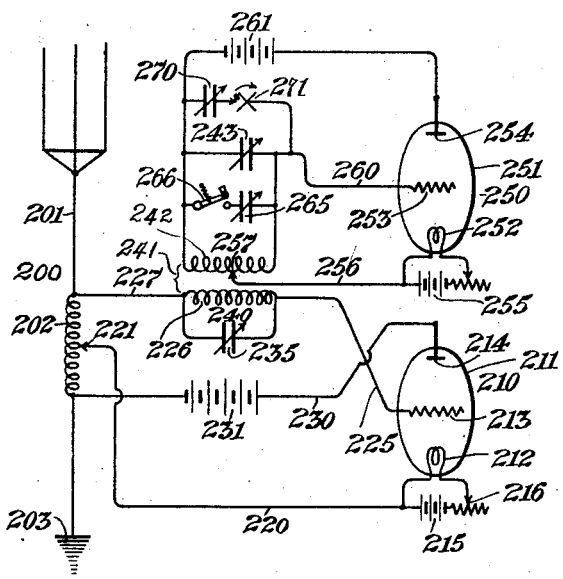
Figure 9:
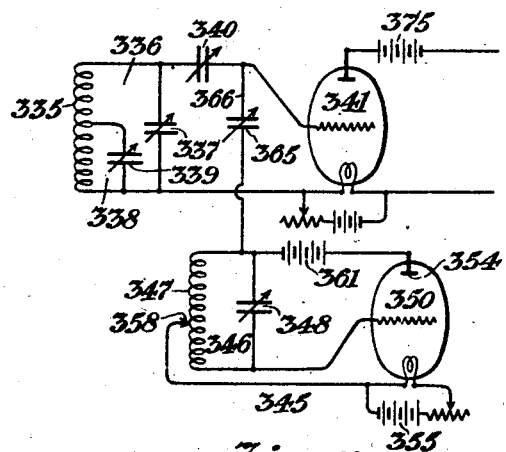
Figure 10:
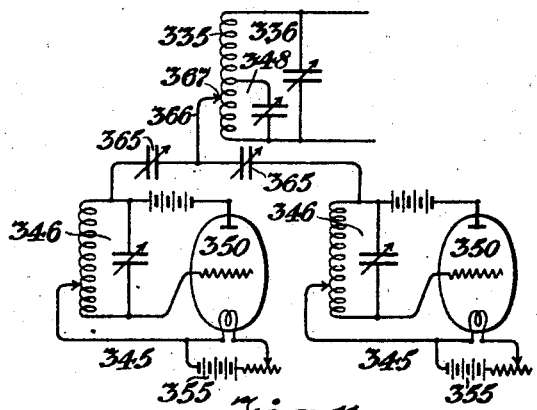
Figure 11:
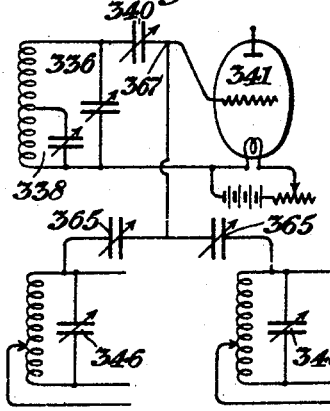
Figure 12:
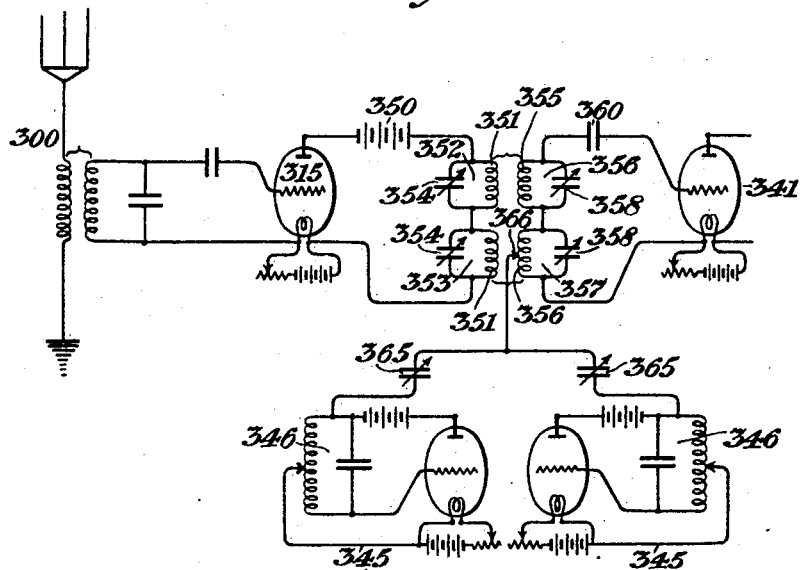

In the accompanying drawings, each of which is a diagrammatic representation of a system or a portion of a system constructed in accordance with this invention, Fig. 1 shows a transmission system; Figs. 2, 2$^a$, and 2$^b$ are modified forms of a portion of the same; Fig. 3 a modified form of transmission system; Fig. 4 a receiving system; Figs. 5 and 6 are two modified forms of transmission systems; Figs. 7 and 8 two different forms of receiving systems; Fig. 9 a modified form of a portion of the system shown in Fig. 7; Figs. 10 and 11 modified forms of a portion of the system shown in Fig. 8; Fig. 12 a further modified form of receiving system; and Fig. 13 a further modified form of transmission system.

One transmission system constructed in accordance with this invention comprises, as shown in Fig. 1, an open aerial circuit 10, including an antenna 11 and inductance 12, through which the antenna is grounded as at 13. The inductance 12 forms the secondary coil of an oscillation transformer 15 which includes a primary coil 16, which is arranged in a closed circuit 20, which includes a spark gap device 21 and a variable condenser 22. The closed circuit 20 is arranged to be energized by a direct current generator 30, or other source of direct current, one pole of which is connected to one side of the variable condenser 22 through a choke coil 31, and the other pole of which is connected to the other side of the variable condenser 22 through a variable resistance 32 and a choke coil 33. The circuit 20 is adjusted in such a manner as to transfer the maximum amount of energy to the aerial circuit 10 which may be tuned for instance to 1,000,000 oscillations per second.

For impressing a plurality of series of periodic amplitude variations having a corresponding plurality of different comparatively low or secondary frequencies respectively upon the oscillations of comparatively high frequency set up in the open aerial oscillatory circuit 10, means are provided including a tone circuit comprising an inductance 40 and a variable condenser 41, which will be referred to hereinafter as the main secondary condenser. Associated with this main secondary condenser are two auxiliary secondary variable condensers 45 and 46, one side of each of which is permanently connected to one side of the main secondary condenser 41. The other sides of the two auxiliary secondary variable condensers 45 and 46 are respectively connected to the other side of the main secondary condenser 41 through a switch or key 49 and a commutator or make and break device 50, which when in operation is arranged to be rotated either at a predetermined constant rate or otherwise by any suitable motor or other means so as to intermittently break the circuit through the corresponding secondary auxiliary condenser 46 in a predetermined manner depending upon the construction of the commutator 50 and its rate of rotation. The speed of rotation of the commutator 50 is preferably such that the circuit through the commutator is interrupted at approximately the same rate as the letters of a message are transmitted. The tone circuit 40, 41 and the auxiliary condensers 45 and 46 may be so proportioned and arranged that when the switch or key 49 is closed and the commutator 50 is in an open position, and the generator 30 is in operation, the tone circuit 40, 41 will be caused to oscillate at a predetermined secondary frequency, for instance, of 31,000 per second, and when the switch or key 49 is closed and the commutator 50 is in a closed position also, completing the circuit through the corresponding auxiliary condenser 46, the tone circuit 40, 41 and 46 will be caused to oscillate, for instance at 29,000 oscillations per second. The arrangement may be such that with the switch or key 49 open, and the commutator 50 open, the tone circuit 40, 41 would be caused to oscillate, for instance, at 32,000 oscillations per second, and such that with the switch or key 49 open and the commutator 50 closed, the tone circuit 40, 41, 45 and 46 would be caused to oscillate at a frequency, for instance of 30,000 oscillations per second.

Instead of the commutator 50, a switch 51 may be substituted as shown in Fig. 2. This switch is preferably normally held open by a spiral spring 52, and the switch may be manually operated to close the circuit from time to time through the auxiliary secondary condenser 46 to change the secondary frequency of oscillation in the tone circuit 40, 41 accordingly.

In Figs. 2ª and 2ᵇ are shown two modified arrangements of the condensers 41, 45 and 46 and the two switches 49 and 51. In each of these arangements the circuits are so timed that the same secondary oscillation effects may be produced as hereinbefore described by manipulating the switches 49 and 51. It is to be understood that in either of these arangements a commutator rotated at a predetermined rate might be substituted for the switch 51, as shown at 50 in Fig. 1.

The commutator 50 may be of any suitable construction and may be arranged either to interrupt the circuit through the auxiliary condenser 46 at a regular predetermined rate, for instance, as shown diagrammatically in Fig. 1, or the commutator 50 may be arranged to interrupt the circuit through the auxilary condenser 46 in such a manner that when the key 49 is open, the corresponding secondary frequencies of, for instance, 32,000 and 30,000 oscillations per second, would be emitted successively by the open aerial circuit 10 in the form of two series of "dots" and "dashes" which might be arranged to form the letters of two separate messages. For instance, instead of the commutator 50 a modified form of commutator 51 might be substituted as shown in Fig. 3. This modified form of commutator comprises a cylindrical body portion 55 made of insulating material and rigidly secured to a shaft 56, which is arranged to be rotated at any suitable rate constant or otherwise by a motor (not shown), or other suitable means. This body portion 55 is provided upon its cylindrical surface with a series of conducting segments 60 which are rigidly secured to the body portion 55 and which are of different lengths to represent "dots" and "dashes" and which are also spaced apart at different distances, so that the spaces between the segments may also indicate "dots" and "dashes." Either the conducting segments 60 or the non-conducting spaces between the segments may be arranged to form the letters of a message, or both may be arranged to form respectively two different messages. The segments 60 are electrically connected by a suitable conductor 61, which is connected by a conductor 62 to a continuous conducting ring 63, which is rigidly secured to the shaft 56 and which is provided with a brush 64, which is connected by a conductor 65 to one side of the hereinbefore described main secondary condenser 41. A brush 66 is arranged in contact with the cylindrical surface of the commutator to be engaged successively by the segments 60, and this brush is connected by a conductor 67 to the hereinbefore described auxiliary secondary condenser 46. The shaft 56 is arranged to be rotated at a predetermined constant or otherwise rate about a fixed axis by any suitable motor or other means (not shown).

In the operation of the transmission system shown in Fig. 1, the generator 30 is operated continuously to deliver a continuous current of any suitable potential to energize the closed oscillatory circuit 20 and to cause this circuit to act inductively through the transformer 15 to energize the open aerial circuit 10 and to cause the open aerial circuit to oscillate at a predetermined frequency, for instance of 1,000,000 oscillations per second, and to emit electroradiant oscillations of the same frequency. The key 49 is normally maintained in an open position and the commutator 50 is rotated continuously to interrupt the circuit through the corresponding auxiliary condenser 46 at predetermined intervals. With the key open and the commutator 50 in operation, the tone circuit 40, 41 would be caused to oscillate alternately at two different frequencies, for instance, of 32,000 and 30,000 oscillations per second, as hereinbefore described, and these oscillations would be impressed upon the oscillations of 1,000,000 per second in the closed oscillatory circuit 20 and consequently would be impressed upon the electro-radiant oscillations emitted by the open aerial circuit 10. The two secondary frequencies of, for instance, 32,000 per second and 30,000 per second might be sent out in any desired sequence through the action of the commutator 50 by having the commutator 50 constructed accordingly, as hereinbefore described.

When it is desired to send a signal with the system shown in Figs. 1 and 2 the key 49 is opened and closed repeatedly in a manner to form the dots and dashes of the message. When the key is closed the tone circuit 40, 41 in combination with the auxiliary condensers 45 and 46 is caused to be oscillated alternately at two different rates, for instance of 31,000 and 29,000 oscillations per second, and these successive groups of oscillations of different frequencies are impressed upon the high frequency oscillations emitted by the open aerial circuit 10 and may be selectively received upon any suitable receiving system to operate a receiving or signalling intrument, or other device, for instance as will appear hereinafter.

In Fig. 4 is shown a modified form of transmission system constructed in accordance with this invention and which comprises an open aerial circuit 75 including an antenna 76 and an inductance 77 through which the antenna is grounded as at 78. The inductance 77 forms the secondary coil of an oscillation transformer 80, which includes a primary coil 81, which is arranged in a closed oscillatory circuit 85, including a variable condenser 86, and a multiplex rotary spark gap device 87.

The closed oscillatory circuit 85 is so adjusted that the maximum energy is transferred to the open aerial circuit 75. The oscillations in circuit 75 may have a frequency of say 1,000,000 oscillations per second. The closed oscillatory circuit 85 is arranged to be energized by a direct current generator 90 or any other suitable source of direct current acting through choke coils 91 and 92. The multiplex rotary spark gap device 87 is preferably arranged to break up the oscillations in the closed circuit 85 either into two alternating series of groups of oscillations having predetermined different group frequencies respectively, or into two other alternating series or groups having two other different predetermined group frequencies respectively, for instance, either into two alternating series of groups having group frequencies of 32,000 and 30,000 per second respectively, or into two alternating series of groups having group frequencies of 31,000 and 29,000 per second, respectively.

In the form of this invention shown in Fig. 4, the multiplex rotary spark gap device 87 comprises a shaft 95, which is arranged to be rotated about a fixed axis at a predetermined rate by means of a motor 96. On the shaft 95 are rigidly secured a plurality, for instance, four, of rotary conducting elements 97, 98, 99 and 100, which are electrically connected to the shaft 95. These rotary elements 97 to 100 are provided respectively with a corresponding plurality of series of radial teeth or projections 101, 102, 103 and 104, and these series of projections are arranged to cooperate respectively with a corresponding plurality of stationary terminals 105, 106, 107 and 108, which are suitably spaced from the rotary elements 97 to 100 respectively, so that when any one of the teeth or projections is opposite a corresponding terminal spark discharge will take place between the tooth and the terminal, but when the space between any two successive teeth is opposite the corresponding terminal, no discharge will take place between the corresponding rotary element and the terminal.

The total number of teeth on any one of the rotary elements 97 to 100 is preferably different from the total number of teeth on any one of the other rotary elements 97 to 100, and any suitable number of teeth may be provided on any particular rotary elements to produce any desired rate of discharge across the gap between the element and the corresponding terminal. For instance, in the form of this invention as shown, the teeth are so arranged that when the shaft 95 is rotated at a predetermined rate, discharges may be produced selectively between the rotary elements 97 to 100 and the corresponding terminals 105 to 108 at rates respectively of 32,000, 30,000, 31,000 and 29,000 discharges per second, depending upon which rotary element 97 to 100 is in operation. Surrounding the shaft 95 and rigidly secured thereto is a continuous conducting ring 110 which is engaged by a stationary brush 111, which is connected by a conductor 112 to the upper end of the primary coil 81, and the primary coil 81 is thus electrically connected simultaneously to all of the rotary elements 97 to 100.

For controlling the rotary elements 97 to 100 and consequently the secondary frequency of the oscillations emitted by the open aerial circuit 75, a commutator 120 is provided, which is arranged to be rotated on a fixed axis at a predetermined rate by a motor 125 or other suitable means. The commutator 120 comprises a cylindrical insulating body portion 130, upon the cylindrical surface of which and rigidly secured thereto are two spaced conducting rings, a primary ring 131 and a secondary ring 132, and four annular series of rectangular spaced conducting segments 133, 134, 135 and 136. Two of these annular series 133 and 134 of conducting segments are electrically connected respectively to opposite sides of the primary conducting ring 131, while the other two annular series 135 and 136 of conducting rings are insulated from the former conducting segments 133 and 134 and are electrically connected to the opposite sides respectively of the secondary ring 132. Arranged to cooperate with the two conducting rings 131 and 132 are two stationary brushes 141 and 142 and these brushes are connected respectively by conductors 143 and 144 to two fixed contacts 145 and 146, which are arranged to be engaged alternately by the free end of a switch or key 150, which is pivoted as at 151 and which is normally held yieldingly against the lower contact 146 by means of a spiral spring 152. The key 150 is connected by a conductor 153 to one side of the variable condenser 86. The commutator 120 is also provided with four stationary brushes 154, 155, 156 and 157, which are arranged to cooperate respectively with the four series of segmental contacts 133, 134, 135 and 136, and which are connected respectively by conductors 160, 161, 162 and 163 to the four terminals 105, 106, 107 and 108.

The segmental contacts 133 and 134 which are connected with the primary ring 131 are so arranged as to alternately engage the brushes 154 and 155 to render the rotary elements 97 and 98 alternately operative to control the secondary frequencies of this system, while the key 150 is in engagement with the lower contact 146 as shown in Fig. 4. The segmental contacts 135 and 136 which are connected to the secondary ring 132 are arranged to engage alternately the brushes 156 and 157 to render the two corresponding rotary elements 99 and 100 alternately operative to control the secondary frequencies of this system when the key 150 is in engagement with the upper contact 145. The segmental contacts in the four series of contacts 133 and 136 may be so proportioned and spaced that when any one series is in operation controlling a corresponding rotary element 97 to 100, it would cause groups of secondary oscillations arranged in the form of "dots" and "dashes" of any predetermined message to be set up in the closed oscillatory circuit 85 and to be inductively impressed upon the high frequency oscillations in the open aerial circuit 75 and consequently impressed upon the high frequency oscillations radiated therefrom.

In the operation of this form of invention shown in Fig. 4 the generator 90 and the two motors 96 and 125 are continuously operated, and the key 150 is normally left in engagement with the lower contact 146. While the key is in this position the closed circuit 85 will be discharged alternately at frequencies of, for instance, 32,000 and 30,000 per second under the control of the commutator and the three brushes 141, 154 and 155. This will cause corresponding alternating series of groups of oscillations to be set up in the open aerial circuit 75 and to be radiated therefrom in a well known manner. These alternating series of groups may be set up by the commutator in the form of two series of messages, as hereinbefore described, and in any case these two alternating series of groups of electroradiant oscillations may be used to puzzle and mislead any operator who attempts to "listen in" on the system. When it is desired to send a message, the outer end of the key 150 is pressed downwardly from time to time to move the inner end of the key 150 into engagement with the upper contact 145 to form suitable "dots" and "dashes", these "dots" and "dashes" to be made up of two alternating series of groups of oscillations having the same high frequency as hereinbefore described, but having two alternating series of group frequencies impressed thereon of, for instance, 31,000 and 29,000 per second respectively. When the key 150 is in engagement with the upper contact 145, the group frequencies of this system will be controlled by the secondary ring 132 and the corresponding segments 135 and 136 in cooperation with the brush 142 and the two brushes 156 and 157, which will alternately render the rotary elements 99 and 100 competent to control the secondary or group frequency of the system, and consequently when the key 150 is in engagement with the upper contact 145, the high frequently oscillations in the closed circuit 85 will be broken up into different series of groups of, for instance, 31,000 and 29,000 per second, and these alternating series of groups of oscillations may be broken up to form "dots" and "dashes" or any desired signal by corresponding manipulation of the key 150. These "dots" and "dashes" may be selectively received upon any suitable receiving system, for instance, on one of the receiving systems hereinafter described.

In Fig. 5 is shown a modified form of transmission system constructed in accordance with this invention. In this modified form the construction is the same as in the system shown in Fig. 4, except that instead of having a commutator 120 to break up the oscillations into alternating series of groups, this modified form in question is provided with substantially parallel switch members 175 and 176, which are arranged to swing about fixed parallel pivots 177 and 178, which are electrically connected respectively to the hereinbefore described contacts 145 and 146 by means of conductors 179 and 180. A crossbar 185 is terminally connected pivotally to the switch members 175 and 176 and is provided with a handle 186 whereby the two switch members may be conveniently oscillated from the position shown in full lines in Fig. 5 to the positions shown in dotted lines. The hereinbefore described terminals 105, 106, 107 and 108 are connected by conductors 190, 191, 192 and 193 to fixed contacts 194, 195, 196 and 197. When the switch members 175 and 176 are in the positions shown in full lines in Fig. 5, they serve to connect the two terminals 106 and 108 with the two contacts 145 and 146, and when the two switch members 175 and 176 are in the positions shown on dotted lines, then these members serve to connect the terminals 105 and 107 with the two contacts 145 and 146. It is therefore thought to be evident that when the switch 150 is in engagement with the lower contact 146 and the switch members 175 and 176 are oscillated between their full line positions and their dotted line positions, the closed circuit 85 will be discharged at two alternating frequencies controlled by the rotary elements 99 and 100. When the key 150 is in engagement with the upper contact 145 and the switch members 175 and 176 are oscillated the closed circuit 85 will be discharged at two alternating frequencies controlled by the rotary elements 97 and 98, as hereinbefore described. It is thought that the operation of this modified system will be evident from the foregoing description.

A further modified form of transmission system constructed in accordance with this invention is shown in Fig. 6 and comprises an open aerial circuit 200 including an antenna 201, and an inductance 202, through which the antenna 201 is grounded as at 203. For controlling the open aerial circuit 200, a thermionic valve 210 is provided, which may be of any well known or suitable construction, for instance, of a construction shown in the drawing and which comprises a highly evacuated glass bulb or container 211, in which is arranged a filament 212, a grid 213, and a terminal 214. The filament 212 is arranged to be heated by a battery 215 acting through a variable resistance 216. One pole of the battery 215 is connected by a conductor 220 to a tap 221, which is adjustably connected to the coil 202. The grid 213 is connected by a conductor 225 to one end of a secondary coil 226, the other end of which is connected by a conductor 227 to the upper end of the coil 202. The terminal 214 is connected by a conductor 230 to the positive pole of a battery 231, the negative pole of which is connected to the lower end of the coil 202. A variable condenser 235 is connected across the secondary coil 226 and forms therewith an oscillatory circuit 240. The secondary coil 226 forms part of a transformer 241, which includes a primary coil 242, which is in an oscillatory circuit including a variable condenser 243 and which is arranged to be controlled by a thermionic valve 250 which is of the same construction as the thermionic valve 210, which includes a bulb 251 having arranged therein a filament 252, a grid 253, and a terminal 254. The filament 252 is arranged to be heated by a battery 255, and one pole of the battery is connected by a conductor 256 to a tap 257, which is adjustably connected to the primary coil 242. The grid 253 is connected by a conductor 260 to one side of the variable condenser 243, and the terminal 254 is connected through a battery 261 to the other side of the variable condenser 243.

For modifying the oscillations set up in the primary coil 242, a main auxiliary variable condenser 265, controlled by a key 266, is connected across the variable condenser 243, and a second auxiliary variable condenser 270, controlled by a rotary interrupter 271, is also connected across the variable condenser 243. This rotary interrupter 271 may be of any suitable form and arranged either to interrupt the circuit through the secondary auxiliary condenser 270 at a uniform rate, or in an irregular manner as hereinbefore described in connection with the commutators 50 and 54, or instead of this rotary interrupter a key might be substituted such as the key 51 shown in Fig. 2.

In the operation of the transmission system shown in Fig. 6, the parts may be so adjusted that under the control of the primary valve 210 oscillations having a frequency of, for instance, 1,000,000 per second will be set up in and consequently radiated from the open aerial circuit 200, and when the key 266 is open and the rotary make-and-break device 271 is in such a position as to break the circuit through the condenser 270, oscillations will be set up in the closed circuit containing the coil 242 and the condenser 243 having a frequency, for instance, of 32,000 per second, and when the device 271 is in such a position as to close the circuit through the condenser 270, this frequency will be modified, for instance, to 30,000 per second. When the key 266 is closed, and the rotary device 271 is open, the frequency of the oscillations in the circuit through the coil 242 will be changed to, for instance, 31,000 per second, and when the key 266 is closed and the rotary device 271 is closed, this frequency will be modified to, for instance, 29,000 per second. Therefore, when the key 266 is left open, two alternating modes of oscillations will be set up in the circuit controlling the coil 242 and having frequencies respectively of 32,000 and 30,000, and when the key 266 is closed two alternating modes of oscillations will be set up in the circuit controlling the coil 242 having frequencies of 31,000 and 29,000 per second respectively. The oscillations set up in the primary coil 242 will be inductively impressed upon the secondary coil 226, and consequently producing corresponding amplitude variations of the oscillations in the open aerial circuit 200 and will produce two alternating series of amplitude variations having alternating frequencies of 32,000 and 30,000 per second, or alternating frequencies of 31,000 and 29,000 per second, depending upon the position of the key 266.

In Fig. 7 is shown one form of receiving system constructed in accordance with this invention and which may be used in receiving radiant energy transmitted, for instance, by any one of the transmission systems shown in Figs. 1, 2, 3, 4, 5 and 6.

This improved receiving system comprises an open aerial circuit 300 including an antenna 301, and an inductance coil 302, through which the antenna 301 is grounded as at 303. The aerial circuit 300 is preferably tuned to the high frequency of the oscillations emitted by the transmission station, for instance, to 1,000,000 oscillations per second, and the coil 302 forms the primary of the transformer 305, which includes a secondary coil 306, which is in a closed oscillatory circuit 307, including a variable condenser 308. This closed circuit 307 is preferably tuned to the frequency of the aerial circuit 300 and is arranged to control through a stoppage condenser 309 a detector 310, which may be of any well known or suitable construction, for instance comprising an evacuated glass bulb or container 315 in which is arranged a filament 316, a grid 317, and a plate or terminal 318. The filament 316 is arranged to be heated by a battery 320. The detector 310 is arranged to control a circuit including a battery 325 and a coil 326, which forms part of a closed oscillatory circuit 327 including a variable condenser 328. A part of the coil 326 is arranged to form a part of the closed oscillatory circuit 330, which includes a variable condenser 331. The two condensers 328 and 331 are preferably so adjusted that the oscillatory circuits comprising condensers 328 and 331 and inductance 326 are tuned to two of the secondary or group frequencies of the transmitters, for instance, to 31,000 and 29,000. The coil 326 is inductively connected to a secondary coil 335, which forms part of a closed oscillatory circuit 336, which includes a variable condenser 337. A part of the secondary coil 335 forms part of a closed oscillatory circuit 338, which includes a variable condenser 339. The doubly periodic circuit made up of condensers 337 and 339 and the inductance 335 is preferably tuned to the same secondary or group frequencies, namely, 31,000 and 29,000. The closed circuit 336 is arranged to act through a stoppage condenser 340 to control a detector 341 constructed as hereinbefore described.

For impressing electrical oscillations, for instance of 30,000 per second upon the alternating oscillations of 31,000 per second and 29,000 per second set up in the closed circuits 336 and 338, as will appear hereinafter, a local oscillator 345 is provided, which may be of any suitable form, for instance, of a form as shown, which comprises a closed oscillatory circuit 346, including a coil 347 and a variable condenser 348, which is arranged to be oscillated as a result of the action of a thermionic valve 350 of any suitable construction, for instance, comprising a highly evacuated glass bulb or container 351, in which is arranged a filament 352, a grid 353, and a terminal 354. The filament 352 is arranged to be heated by a battery 355 acting through a variable resistance 356. One pole of the battery 355 is connected by a conductor 357 with a tap 358, which is adjustably connected to the coil 347. The grid 353 is connected by a conductor 360 to one side of the variable condenser 348, and the terminal 354 is connected through a battery 361 to the other side of the variable condenser 348. The closed circuit 346 is connected through a variable condenser 365 and a conductor 366 to a tap 367, which is adjustably connected to the secondary coil 335; this connection between the closed circuit 346 and the coil 355, including the variable condenser 365 and the tap 367, constitute a means of varying the intensity of the oscillations of the 30,000 per second frequency which will be forced in the circuits 336 and 338. The closed circuit 336 may be grounded through a conductor 370 in any suitable manner. The oscillator 345 acts in a well known manner to impress upon the closed circuits 336 and 338 oscillations having a frequency of, for instance, 30,000 per second.

The detector 341 is arranged to control a circuit including a battery 375 and a coil 376, which is in a closed oscillatory circuit 377, which includes a variable condenser 378 and which is preferably tuned to the frequency of the beats produced in the circuits 336 and 338 as a result of the composition of the local oscillation of frequency of for instance 30,000 and either of the secondary frequencies to which circuits 336 and 338 responds as for instance 31,000 and 29,000, controlling the detector 341, for instance 1,000 oscillations per second. The closed circuit 377 is inductively connected to a closed circuit 380, which includes a coil 381 and a variable condenser 382, and which is arranged to act through a stoppage condenser 383 to control a detector 385 constructed as hereinbefore described, or in any other suitable manner, and which is arranged to control a circuit including a battery 386 and a telephone receiver 387 or other suitable receiving instrument or device.

In the operation of this receiving system shown in Fig. 7, when an impulse consisting of two alternating series of oscillations having a wave frequency of, for instance, 1,000,000 per second and having alternating frequencies of amplitude variations of 29,000 and 31,000 per second is received by the aerial circuit 300, corresponding oscillations are set up in the aerial circuit 300 and are inductively set up in the closed circuit 307. These oscillations act on the primary detector 310 and produce two alternating series of unidirectional electrical impulses in the circuit 325, 326 controlled by the detector 310. These two alternating series of impulses cause corresponding electrical oscillations having frequencies of 29,000 and 31,000 per second to be set up in the closed oscillatory circuits 327 and 330. These oscillations act inductively through the coil 326 upon the two closed circuits 336 and 338 to cause corresponding oscillations therein of 29,000 and 31,000 per second, and superimposed upon these oscillations are oscillations of 30,000 per second set up by the oscillator 345, which thus forms alternately in the two closed circuits 336 and 338 electrical beats having a frequency of 1,000 per second. These beats act through the detector 341 to set up corresponding unidirectional impulses having a frequency of 1,000 per second in the circuits 375 and 376 controlled by the detector 341. These unidirectional impulses act to set up electrical oscillations of 1,000 per second in the closed circuit 377, which is tuned to 1,000 oscillations per second. These oscillations act inductively upon the closed circuit 380 to cause the operation of the detector 385, and to cause corresponding unidirectional impulses of 1,000 per second in the circuit controlled by the detector 385 including the battery 386 and the telephone receiver 387. These beats of 1,000 per second may thus be clearly heard in the telephone receiver 387.

In Fig. 8 is shown a modified form of receiving system in which the construction is the same as in the system shown in Fig. 7, except that instead of the oscillator 345 of Fig. 7 an oscillator 400 is provided, which is of the same construction as the oscillator of Fig. 7, but with the addition of a secondary closed oscillatory circuit 401, which includes a part of the coil 348 and a variable condenser 402. In the receiving system shown in Fig. 8, the doubly periodic closed circuits 327 and 330 may be tuned, for instance, to 25,000 and 30,000 oscillations per second, and the closed circuits 336 and 337 may be correspondingly tuned to the same frequencies. The doubly periodic system made up of the two closed circuits 346 and 401 of the oscillator 400 may be tuned, for instance, to any one of the corresponding pairs of frequencies of 26,000 and 29,000 per second, 26,000 and 31,000 per second, 24,000 and 29,000 per second, or 24,000 and 31,000 per second. It is to be noted that in any case the two frequencies of the circuits 346 and 401 of the oscillator 400 differ from the frequencies of the closed circuits 327 and 330 by 1,000 oscillations per second, and consequently the oscillations produced by the oscillator 400 when impressed upon the oscillations in the circuits 336 and 337 through the electrostatic coupling 365 and 367 will produce or act upon the oscillations in the circuits 336 and 337 to produce electrical beats in each of these two circuits 336 and 337 having a frequency in any of the cases mentioned of 1,000 beats per second.

In the operation of the modified system shown in Fig. 8, any suitable transmission system may be utilized which will produce high frequency oscillations having a single high frequency, for instance, of 1,000,000 per second and having alternating or group frequencies of amplitude variations of, for instance, 30,000 and 25,000 per second. Any one of the hereinbefore described transmission systems might be used in connection with the receiving system shown in Fig. 8, provided the circuits of the transmission system were suitably tuned to give the required frequencies. When oscillations having a single high frequency and a suitable plurality of series of group frequencies or frequencies of amplitude variation impressed thereon are received by the open aerial circuit 300 shown in Fig. 8, the system will operate substantially as in the case of the system shown in Fig. 7 to control the telephones 387 or other receiving instruments or devices, except that instead of having the beats of 1,000 per second produced upon the two frequencies of 30,000 and 25,000 per second by oscillations of a single frequency, the local oscillator 400 produces two simultaneous series of oscillations having two different frequencies which combine with the two secondary frequencies of the circuits 327 and 330 to produce the electrical beats, and these beats act to cause the operation of the detector 241 and to set up oscillations of 1,000 per second in the closed circuit 377, which is suitably tuned and which acts to control the closed circuit 380, which controls the detector 385 to cause unidirectional impulses of 1,000 per second to flow in the control circuit 386 and which will be heard in the telephone 387.

In Fig. 9 is shown a modified form of a portion of the system shown in Fig. 7. In this modified form, instead of connecting the electrostatic coupling 365, 366 directly to the coil 335, as shown in Fig. 7, the electrostatic coupling 365, 366 of the oscillator 345 is connected to the conductor which connects the stoppage condenser 340 with the grid of the secondary detector 341. When thus connected the oscillator 345 acts as hereinbefore described to impress oscillations of for instance 30,000 per second upon the oscillations of 29,000 and 31,000 per second which are set up in the double periodic circuits 336 and 338, and thus produces beats of 1,000 per second in these circuits, as hereinbefore described. The system shown in Fig. 7 remains otherwise unchanged in the modified form shown in Fig. 9.

In Fig. 10 is shown a modified form of a portion of the system shown in Fig. 8. In this modified form the construction is the same as in the system shown in Fig. 8 except instead of having a single oscillator 400 arranged to produce the two different frequencies of for instance 26,000 and 29,000 oscillations per second, two separate oscillators 345, 345 constructed in the same manner as the oscillator 345 hereinbefore described, and having respectively two closed circuits 346 tuned respectively to the two desired frequencies, for instance to 26,000 and 29,000 or 26,000 and 31,000 or 24,000 and 29,000 or 24,000 and 31,000 oscillations per second, are connected respectively to the coil 335 of Fig. 8 through an electrostatic coupling comprising two variable condensers 365, a conductor 366 and an adjustable tap 367. In this modified form the two oscillators 345, 345 act to impress upon the oscillations of for instance 25,000 and 30,000 set up in the doubly periodic circuits 336 and 338, oscillations having the frequencies to which the two closed circuits 346, 346 are tuned, for instance of 36,000 and 39,000 oscillations per second and thus beats of 1,000 per second are set up in the doubly periodic circuits 336 and 338.

In Fig. 11 is shown a further modified arrangement of the two oscillators 345, 345 shown in Fig. 10. In this modified form the arrangement is the same as shown in Fig. 10 except that instead of connecting the tap 367 to the coil 335, the tap 367 is connected to the conductor between the stoppage condenser 340 and the grid of the secondary detector 341. In this modified form the operation would be substantially the same as that described in connection with Fig. 10, and beats of for instance 1,000 per second would consequently be set up in the doubly periodic circuits 336 and 338 controlling the secondary detector 341 of the system shown in Fig. 8.

In Fig. 12 is shown a portion of a modified receiving system constructed in accordance with this invention and which is identical in construction and operation with the receiving system shown in Fig. 8 except that instead of the circuits shown in Fig. 8 and controlled by the primary detector 315 and controlling the secondary detector 341, the circuits shown in Fig. 12 are substituted. In the modified form shown in Fig. 12 the primary detector 315 controls a circuit which includes a battery 350 and two primary coils 351, 351, which are arranged respectively in two oscillatory circuits 352 and 353 including respectively two variable condensers 354 and which are tuned respectively to for instance 30,000 and 25,000 oscillations per second. The two primary coils 351 are inductively coupled respectively to two secondary coils 355 which are arranged respectively in two closed oscillatory circuits 356 and 357 including respectively two variable condensers 358 and which are tuned respectively to the same frequencies as the circuits 352 and 353 by which they are controlled. The two secondary coils 355 are arranged in a circuit which includes a stoppage condenser 360 and which is arranged to control the secondary detector 341 which is arranged, as shown in Fig. 8, to act through a third detector 385 to control a telephone 387 or other suitable receiving instrument. The two oscillators 345, 345, which are each the same in construction as the oscillator 345 shown in Fig. 7 include respectively two oscillatory circuits 346 which are tuned respectively to appropriate frequencies, for instance to 26,000 and 29,000 or 26,000 and 31,000 or 24,000 and 29,000 or 24,000 and 31,000 oscillations per second. These two circuits 346 are connected through two variable condensers 365 to a tap 366 which is adjustably connected to one of the secondary coils 355, but which may be connected to the conductor between the stoppage condenser 360 and the grid of the secondary detector 341, as shown in Fig. 11.

In the operation of the system shown in Fig. 12 oscillations of 25,000 and 30,000 per second are set up in the two closed circuits 352 and 353 which produce corresponding oscillations in the two closed circuits 356 and 357, and the two oscillators 345 act to impose beats of 1,000 per second upon the oscillations set up in the two closed circuits 356 and 357. These oscillations and beats act through the secondary detector 341, as hereinbefore described, in connection with Fig. 8 to control a telephone 387 or other suitable receiving instrument.

Figure 13:
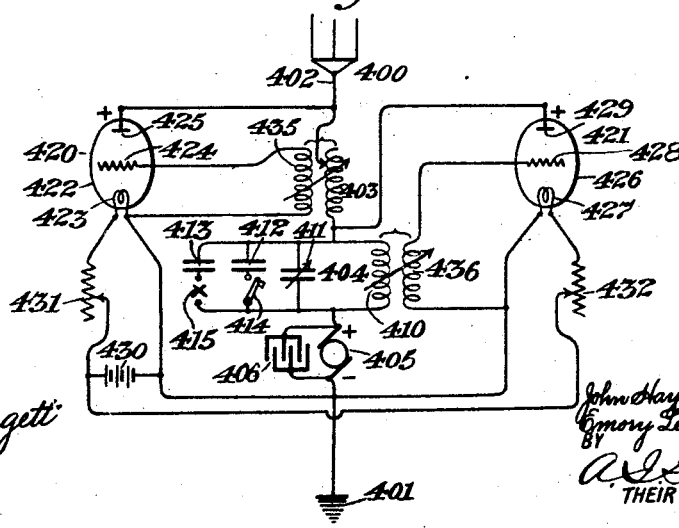

In Fig. 13 is shown a modified form of transmission system constructed in accordance with this invention, and which is similar in some respects to the form shown in Fig. 6. This modified form comprises an open aerial circuit 400 which is grounded as at 401, and which includes an antenna 402, a variable inductance 403, a variable oscillation circuit 404, and a direct current electric generator 405 or other source of direct current. A relatively large condenser 406 is shunted around the generator 405 to permit electrical oscillations to pass around the generator from the antenna 402 to the ground 401.

The variable oscillation circuit 404 includes a secondary inductance 410, a main variable condenser 411 and two auxiliary variable condensers 412 and 413 which are in parallel with the main condenser 411 and which are controlled respectively by a key 414 and a key or commutator 415. The three condensers 411, 412 and 413 of Fig. 13 correspond to the three condensers 243, 265 and 270 of Fig. 6, and the key 414 and commutator 415 of Fig. 13 correspond to the key 266 and commutator 211 of Fig. 6.

For controlling the open aerial circuit 400, a main or high frequency thermionic valve 420 and an auxiliary or secondary frequency thermionic valve 421 are provided. These valves may be of any well known or suitable construction and in the form shown include respectively an evacuated glass container 422 in which is arranged a filament 423, a grid 424 and a terminal 425; and an evacuated container 426 in which is arranged a filament 427, a grid 428, and a terminal 429. The two filaments 423 and 427 are arranged to be heated by the same battery 430 acting through two variable resistances 431 and 432. The grid 424 of the main valve 420 is connected to the corresponding filament 423 through a circuit including a coil 435 which is suitably and adjustably coupled to the variable inductance 403 of the open aerial circuit, and the grid 428 of the auxiliary valve 421 is connected to the corresponding filament 421 through a circuit including a coil 436 which is suitably and adjustably coupled to the secondary coil 410 of the variable oscillation circuit.

In the operation of the system shown in Fig. 13, the system is so adjusted that the open aerial circuit will be oscillated at a predetermined high frequency, for instance at 1,000,000 oscillations per second under the action of the main valve 420, and so that when the commutator 415 is rotated the variable closed circuit 404 will be caused to oscillate under the action of the auxiliary valve 421 alternately at for instance 31,000 and 29,000 oscillations per second when the key 414 is closed, and at for instance 32,000 and 30,000 oscillations per second when the key 414 is open. These oscillations of the variable closed circuit are impressed upon the current flowing through the high frequency bulb 420 from the generator 405 and cause corresponding periodic variations in the voltage of the terminal 425 of the bulb and consequently corresponding periodic amplitude variations in the high frequency oscillations generated in and emitted by the open aerial circuit 400. The radiant impulses emitted by the open circuit 400 may be received upon any suitable receiving system, as hereinbefore described.

Although a few of the many forms in which this invention may be embodied have been shown herein, it is to be understood that this invention is not limited to any specific system but might be applied in various systems without departing from the spirit of the invention or the scope of the appended claims.

Having thus fully described the invention, we claim:

1. In a system for the transmission of radiant energy, the combination with means for emitting radiant oscillations having a predetermined frequency, of means for impressing upon said oscillations a plurality of series of periodic variations having different frequencies respectively, means operative to vary the frequency of each of said series of periodic variations, and means for receiving said oscillations and variations comprising an element tuned to said first mentioned frequency cooperating elements controlled by said first-mentioned element and tuned respectively to said second-mentioned frequencies as varied, and a device controlled by the conjoint action of said elements.

2. In a system for the transmission of radiant energy, the combination with means for emitting radiant oscillations having a predetermined frequency, of means for impressing upon said oscillations a plurality of series of periodic amplitude variations having different frequencies respectively, means operative to vary the frequency of each of said series of periodic variations, and means for receiving said oscillations and variations comprising an element tuned to said first-mentioned frequency cooperating elements controlled by said first-mentioned element and tuned respectively to said second-mentioned frequencies as varied, and a device controlled by the conjoint action of said elements.

3. The combination with means for emitting radiant oscillations, of means for impressing upon said oscillations two alternating series of periodic variations having two different frequencies respectively, and means for varying both of said frequencies from time to time to form signals.

4. The combination with means for emitting radiant oscillations, of means for impressing upon said oscillations two alternating series of periodic amplitude variations having two different frequencies respectively, and means for varying both of said frequencies from time to time to form signals.

5. The combination with means for emitting radiant oscillations, of means for impressing upon said oscillations in rotational sequence a plurality of series of periodic variations, and means in shunt with said last named means for varying the frequency of one of said series of variations.

6. The combination with means for emitting radiant oscillations, of means for impressing upon said oscillations in rotational sequence a plurality of series of periodic variations, and means in shunt with said last named means for varying the frequencies of said series of variations.

7. The combination with means for emitting radiant oscillations, of means for impressing upon said oscillations in rotational sequence a plurality of series of periodic variations of different frequencies respectively, and means in shunt with said last named means for varying the frequency of one of said series of variations.

8. The combination with means for emitting radiant oscillations, of means for impressing upon said oscillations in rotational sequence a plurality of series of periodic amplitude variations of different frequencies respectively, and means in shunt with said last named means for varying the frequencies of said series of variations.

9. The combination with means for emitting radiant oscillations, of means automatically operative to impress upon said oscillations in rotation and through predetermined periods respectively, a plurality of series of periodic variations of normally substantially constant frequency.

10. The combination with means for emitting radiant oscillations, of means automatically operative to impress upon said oscillations in rotation and through predetermined periods respectively, a plurality of series of periodic amplitude variations of normally substantially constant frequency.

11. The combination with means for emitting radiant oscillations, of means for impressing upon said oscillations in rotational sequence, a plurality of series of periodic variations having different frequencies respectively, and means for varying said frequencies from time to time to form signals.

12. The combination with means for emitting radiant oscillations, of means for impressing upon said oscillations in rotational sequence, a plurality of series of periodic amplitude variations having different frequencies respectively, and means for varying said frequencies from time to time to form signals.

13. The combination with means for emitting radiant oscillations, of means for impressing upon said oscillations in rotational sequence, a plurality of series of periodic variations having different frequencies respectively, and means for varying said frequencies in such a manner as to substitute for said first mentioned variations a plurality of rotational series of periodic variations having frequencies differing respectively from said first mentioned frequencies.

14. The combination with means for emitting radiant oscillations, of means for impressing upon said oscillations in rotational sequence, a plurality of series of periodic amplitude variations having different frequencies respectively, and means for varying said frequencies in such a manner as to substitute for said first mentioned variations a plurality of rotational series of periodic variations having frequencies differing respectively from said first mentioned frequencies.

15. The combination with means for emitting radiant oscillations, of means automatically operative to impress upon said oscillations in rotational sequence, a plurality of series of periodic variations, means automatically operative to cause one of said series of variations to be modified from time to time at predetermined intervals to form signals, and means operative to substitute for said plurality of series of periodic variations a second plurality of series of periodic variations having frequencies different respectively from said first mentioned frequencies.

16. The combination with means for emitting radiant oscillations, of means automatically operative to impress upon said oscillations in rotational sequence, a plurality of series of periodic variations, means automatically operative to cause one of said series of variations to be interrupted from time to time at predetermined intervals to form signals, and means operative to substitute for said pluraltiy of series of periodic variations a second plurality of series of periodic variations having frequencies different respectively from said first mentioned frequencies.

17. The combination with means for emitting radiant oscillations, of means automatically operative to impress upon said oscillations in rotational sequence, a plurality of series of periodic amplitude variations, means automatically operative to cause one of said series of variations to be modified from time to time at predetermined intervals to form signals, and means operative to substitute for said plurality of series of periodic variations a second plurality of series of periodic variations having frequencies different respectively from said first mentioned frequencies.

18. The combination with means for emitting radiant oscillations, of means automatically operative to impress upon said oscillations in rotational sequence, a plurality of series of periodic amplitude variations, means automatically operative to cause one of said series of variations to be interrupted from time to time at predetermined intervals to form signals, and means operative to substitute for said plurality of series of periodic variations a second plurality of series of periodic variations having frequencies different respectively from said first mentioned frequencies.

19. The combination with means for emitting radiant oscillations, of means for impressing upon said oscillations in rotational sequence, a plurality of series of periodic variations having different frequencies respectively, means automatically operative to interrupt one of said series of variations from time to time at predetermined intervals, means operative to substitute for said plurality of series of periodic variations a second plurality of series of periodic variations having frequencies different respectively from said first mentioned frequencies, and means automatically operative to interrupt from time to time, at predetermined intervals, one of said second mentioned plurality of series of periodic variations.

20. A receiving system for radiant energy comprising an electrical circuit tuned to a given frequency, a detector controlled by said circuit, a double periodic circuit tuned to oscillate in response to two different secondary frequencies, local means for producing in said double periodic circuit oscillations having a frequency differing equally from said secondary frequencies so as to produce electrical beats having a predetermined frequency in said double periodic circuit, a detector controlled by said double periodic circuit, a circuit controlled by said detector and tuned to the frequency of said beats, and a receiving device arranged to be operated as a result of the action of said electrical beats upon said last mentioned circuit.

21. A receiving system for radiant energy comprising an electrical circuit, a detector controlled by said circuit, a plurality of cooperating circuits tuned to respond to a plurality of predetermined frequencies and arranged to be controlled by said detector, means for producing electrical beats in said plurality of circuits, wave responsive means controlled by said plurality of circuits, oscillatory means controlled by said wave responsive means and tuned to respond to said beats, wave responsive means controlled by said oscillatory means, and a receiving instrument controlled by said last mentioned wave responsive means.

22. A receiving system for radiant energy comprising an aerial circuit, a detector controlled by said circuit, a plurality of cooperating circuits tuned to respond to a plurality of predetermined frequencies and arranged to be controlled by said detector, means for imposing upon said plurality of cooperating circuits a plurality of series of oscillations having frequencies differing from said first mentioned frequencies respectively by a predetermined amount to produce electrical beats having a predetermined frequency in said plurality of circuits, detecting means controlled by said plurality of circuits, oscillatory means tuned to the frequency of said beats and controlled by said detecting means, detecting means controlled by said oscillatory means, and a receiving device controlled by said last mentioned detecting means.

23. A method for the transmission of radiant energy, which consists in emitting waves including a plurality of series of periodic radiant impulses having different frequencies respectively, selectively receiving said impulses, producing a series of electrical beats with each of said series of received impulses, all of the series of beats having the same frequency, selectively receiving said beats and causing said beats to cooperate in the control of a receiving device.

24. A method of transmitting radiant energy, which consists in generating a series of radiant impulses having a frequency above audibility, impressing upon said series of impulses a plurality of series of periodic modifications having different frequencies respectively, all of said frequencies being above audibility, selectively receiving said impulses and modifications and causing the same to cooperate in the production of a sound.

25. A method for transmitting radiant energy, which consists in generating a series of electrical oscillations having a predetermined high frequency impressing thereon, a plurality of series of periodic impulses having different frequencies respectively, each of said frequencies being above audibility, selectively receiving said impulses, and causing said received impulses to cooperate in the production of a tone.

26. A transmission system for radiant energy, including an open aerial circuit having therein a source of direct current, a condenser shunted around said source, an oscillatory circuit included in said open aerial circuit and comprising a coil, a plurality of condensers arranged in parallel with said coil, and means for rendering one of said condensers periodically operative.

27. A transmission system for radiant energy including an open aerial circuit having therein a source of direct current, a condenser shunted around said source, an oscillatory circuit included in said open aerial circuit and comprising a coil, a plurality of condensers arranged in parallel with said coil, means for rendering one of said condensers periodically operative, a thermionic oscillator inductively coupled to said coil, and a source of electrical impulses inductively coupled to said aerial circuit.

28. A method for the transmission of radiant energy which consists in emitting waves including a plurality of series of periodic impulses having different frequencies respectively, selectively receiving said impulses, producing a series of electrical beats with each of said series of received impulses, all of the series of beats having the same frequency, selectively receiving said beats, and causing said beats to cooperate in the control of a receiving device.

29. A method of transmitting and receiving energy which consists in generating waves including a plurality of series of periodic impulses having different frequencies respectively, selectively receiving a plurality of series of said plurality of series of impulses, combining with said received impulses other periodic impulses differing in frequency from said received impulses and forming therewith a plurality of series of periodic beats and causing said beats to cooperate in the control of a receiving device.

30. A method of transmitting and receiving energy which consists in generating waves including a plurality of successive series of periodic impulses having different frequencies respectively, selectively receiving the same and combining therewith other periodic impulses to produce a plurality of successive series of beats and causing said beats to cooperate in the control of a receiving device.

31. A method of transmitting and receiving energy which consists in generating waves including a plurality of successive series of periodic impulses having different frequencies respectively, selectively receiving the same and combining therewith other locally produced periodic impulses to produce a plurality of successive series of beats, and causing said plurality of series of beats to cooperate in the control of a receiving device.

32. A method of receiving and transforming oscillating energy which includes a plurality of series of periodic impulses of different frequencies respectively, which consists in receiving said energy, rectifying the received energy, causing the rectified energy to produce a plurality of series of periodic oscillations having different frequencies respectively, producing in each of said series of oscillations a series of periodic variations, and causing one of said series of periodic variations to cooperate with another of said series of variations to control a receiving device.

33. A method of receiving and transforming waves which include a plurality of successive series of periodic impulses, which consists in receiving said waves and causing the same to produce a plurality of series of oscillations, producing in said oscillations a plurality of series of periodic variations, and causing said plurality of series of variations to cooperate in the control of a receiving device.

34. A method for transmitting and receiving energy which consists in generating a series of waves having impressed thereon a plurality of series of amplitude variations having different frequencies respectively, substituting from time to time for said plurality of series another plurality of series having other different frequencies respectively, to form a signal, and receiving some of said last mentioned series, and combining same to produce beats, and combining said beats with locally produced oscillations to produce audible beats.

35. A method for transmitting and receiving energy which consists in generating a series of waves having impressed thereon a plurality of series of amplitude variations having different frequencies respectively, substituting from time to time for said plurality of series another plurality of series having other different frequencies respectively, to form a signal, and receiving some of said last mentioned series, and combining same to produce beats, and acting upon said beats to produce audible impulses.

36. A method of transmitting and receiving energy which consists in generating a series of waves having impressed thereon a plurality of series of amplitude variations having different frequencies respectively, receiving said plurality of series, combining with said received impulses other periodic impulses differing in frequency from said received impulses and forming therewith a plurality of series of periodic beats, and causing said beats to co-operate in the control of the receiving device.

37. The combination with means for emitting radiant oscillations, of means for impressing upon said oscillations alternatively a plurality of series of periodic variations having different frequencies respectively, and means for changing the frequencies of said series of periodic variations in accordance with a message.

38. In a system for transmitting energy, the combination with means for producing a series of high frequency impulses, means for impressing on said impulses variations of a substantially super-audible frequency lower than the frequency of said impulses, and means for changing the frequency of said last-named variations from one to another of different, predetermined values in accordance with signals.

Signed at New York, in the county of New York and State of New York, this 25th day of April, 1918.

JOHN HAYS HAMMOND, Jr.

Signed at Cambridge, in the county of Middlesex and State of Massachusetts, this 22nd day of April, 1918.

EMORY LEON CHAFFEE.